US005386619A

United States Patent [19]

Wark

[11] Patent Number: 5,386,619

[45] Date of Patent: Feb. 7, 1995

[54] COAL PULVERIZER AND METHOD OF IMPROVING FLOW THEREIN

[75] Inventor: Rickey E. Wark, Longview, Tex.

[73] Assignee: Sure Alloy Steel Corp., Madison Heights, Mich.

[21] Appl. No.: 135,726

[22] Filed: Oct. 13, 1993

[51] Int. Cl.[6] ........................ B23P 17/04; B02C 15/04

[52] U.S. Cl. ........................ 29/401.1; 241/52; 241/57; 241/80; 241/109; 241/119

[58] Field of Search ........................ 241/52, 57, 58, 60, 241/81, 103, 109, 115-121; 29/401.1

[56] References Cited

U.S. PATENT DOCUMENTS

| | | | |
|---|---|---|---|
| 1,834,094 | 12/1931 | Fraser | 241/109 X |
| 4,049,203 | 9/1977 | McKenzie | 241/57 X |
| 4,085,897 | 4/1978 | Hahn et al. | 241/57 X |
| 4,234,132 | 11/1980 | Maliszewski, Jr. | 241/57 X |
| 4,606,506 | 8/1986 | Okada et al. | 241/109 |
| 4,687,145 | 8/1987 | Dougan et al. | 241/57 |
| 4,715,544 | 12/1987 | Folsberg | 241/57 |

FOREIGN PATENT DOCUMENTS 3515444 10/1986 Germany .............................. 241/57

OTHER PUBLICATIONS

"Ni-Hard Vane Wheel Arrangment".
"Figure E. Classifier Discharge Section" Babcock & Wilcox Customer Parts and Services.
"Figure B. Top Housing and Swing Valve Assembly" Babcock & Wilcox Customer Parts and Services.

*Primary Examiner*—Timothy V. Eley
*Attorney, Agent, or Firm*—Young, MacFarlane & Wood

[57] ABSTRACT

An improved coal pulverizer classifying system in which the feedpipe and classifier cone are provided with extensions to protect coal flow into the pulverizer from the annular fine-lifting airflow from the pulverizer throat. The feedpipe and cone extensions replace traditional intermittent discharge structure, improving flow through the classifier system and reducing the disruptive effects of the discharge on the annular flow from the pulverizer throat. An adjustable classifier venturi is also provided to adjust the exit angle and exit velocity of the fines leaving the classifier cone by the combustion delivery chute.

11 Claims, 2 Drawing Sheets

COAL PULVERIZER AND METHOD OF IMPROVING FLOW THEREIN

FIELD OF THE INVENTION

The invention relates in general to coal pulverizers, and more particularly to improvements in the coal feed and classifier cone structure associated with such pulverizers.

BACKGROUND OF THE INVENTION

Coal-fired combustion systems such as those used in large utility applications require finely-ground coal particles or "fines" for efficient operation. In general, it is desirable to use only very-finely pulverized coal in such systems in order to keep NOX emissions and oversized loss-on-ignition (LOI) unburned coal particles from contaminating the marketable ash byproduct of the combustion chamber. It is accordingly important to maintain close control over the fineness of the pulverized coal fed into the combustion system.

Bowl mill-type pulverizers, such as the type disclosed in U.S. Pat. No. 4,687,145, are commonly used to grind the coal and classify the resulting fines. A vertical feedpipe drops raw coal from several feet adore the pulverizer to the center of the pulverizer or grinding. An annular and upwardly-directed flow of air through a ring-shaped "throat" blows the ground coal particles up and around the pulverizer to a classifier system and combustion delivery chute feeding the combustion chamber. The classifier system removes oversized particles of coal from the flow of air and coal fines, returning them to the pulverizer for regrinding.

A known system for classifying these upwardly traveling fines consists of an inverted classifier cone mounted above the pulverizer and concentric with the feedpipe that delivers raw coal to the center to the pulverizer. The lower, smaller outlet end of the classifier cone essentially surrounds the outlet end of the feedpipe, while the larger, upper inlet or mouth of the cone surrounds the combustion delivery chute.

A stationary ring of classifier vanes is mounted at the mouth of the cone to receive the annular, upward flow of pulverized coal/air from the pulverizer and redirect it into the classifier cone in a centrifugal As the coal fines and air swirl around in the classifier cone, the heavier particles gravitate to the sides and settle out at the bottom of the cone, while the lighter, more finely ground fines are swirled up and into the entrance of the combustion delivery chute.

As the heavier particles of coal collect at the bottom of the classifier cone, they are typically contained by a flapper valve assembly at the bottom of the cone, comprising a series of vertically hanging plates blocking the openings of one or more outlet chutes. The plates are relatively heavy, and are forced open only intermittently by the weight of the accumulated coal at the bottom or the classifier cone. These fine "rejects" then fall into the bowl mill pulverizer along with incoming raw coal from the feedpipe for regrinding.

There are a number of disadvantages inherent in prior art systems such as those described above.

The prior art positioning of the feedpipe ant classifier cone outlets well above the pulverizer often results in fine rejects being blown back up through or around the classifier cone when the flapper assembly opens for a discharge. This is primarily due to the position of the outlets relative to the annular flow of coal fines/air from the pulverizer Moreover, the flapper assembly and other prior art intermittent cone discharge systems such as "hula skirt" assemblies (circular arrangements of overlapping metal leaves) can become stuck in an open position, adding to the problem of fine reject backflow into the combustion delivery chute and further defeating the function of the classifier cone.

SUMMARY OF THE INVENTION

Air flow throughout the entire pulverizer feed and classifying system is critical in controlling the ultimate fineness of coal delivered to the combustion system. My invention is accordingly directed to improving the various air and coal flow paths throughout one pulverizer to optimize each and to prevent them from interfering with one another. In a first form my invention uses extensions of the feedpipe and classifier cone to eliminate the adverse effects of the annular fine-lifting air flow from the pulverizer throat on the function of the classifier cone, to improve the intrinsic functioning of the classifier cone, and to eliminate the need for complex and unreliable intermittent discharge structure in the classifier cone.

This is generally achieved by extending the feedpipe and classifier cone such that the drop-points for raw coal from the feedpipe and for reject fines from the cone are within, rather than above, the pulverizer. These extensions significantly reduce the tendency of the annular, fine-lifting flow around the outside or the pulverizer to deviate and work back up against the flow of raw coal and fine rejects into the pulverizer.

The reject fines spiraling down the cone around the feedpipe are further drawn into the pulverizer by an improved pressure flow effect from the extended feedpipe in a manner which prevents diversion of the fines back up into or around the classifier cone.

In a particular embodiment of the invention, the flapper valve or other intermittent discharge structure is removed from-the classifier cone outlet, and replaced with a continuous flow feedpipe extension extending well below the original classifier cone outlet to a point proximate the grinding surface of the pulverizer. The classifier cone is extended in similar fashion with an extension concentric with the feedpipe and extending into the pulverizer to a point proximate the feedpipe extension outlet. In a preferred form the classifier cone extends into the pulverizer slightly farther than the feedpipe extension, with its outlet slightly below that of the feedpipe extension, such that the raw coal flow through the feedpipe creates a desirable pressure flow effect drawing the reject fines from the cone into the pulverizer.

The continuous-flow feedpipe and classified cone extensions, when properly adjusted relative to the pulverizer and its annular fine-lifting airflow, provide a steady flow equilibrium not attainable with the intermittent discharge structure which they replace.

In a further embodiment of the invention, a classifier venturi is mounted in vertically-adjustable fashion on an upper end of the feedpipe within the classifier cone and near the combustion delivery chute to regulate chute size and fine escape velocity. The venturi is configured to provide angled deflector surfaces to slow down large pieces of coal entrained in the combustion delivery flow, causing them to drop back into the classifier cone and pulverizer for regrinding.

These ad other features and advantages of the present invention will become apparent upon further reading of the specification.

DETAILED DESCRIPTION OF THE DRAWINGS

Figure 1:
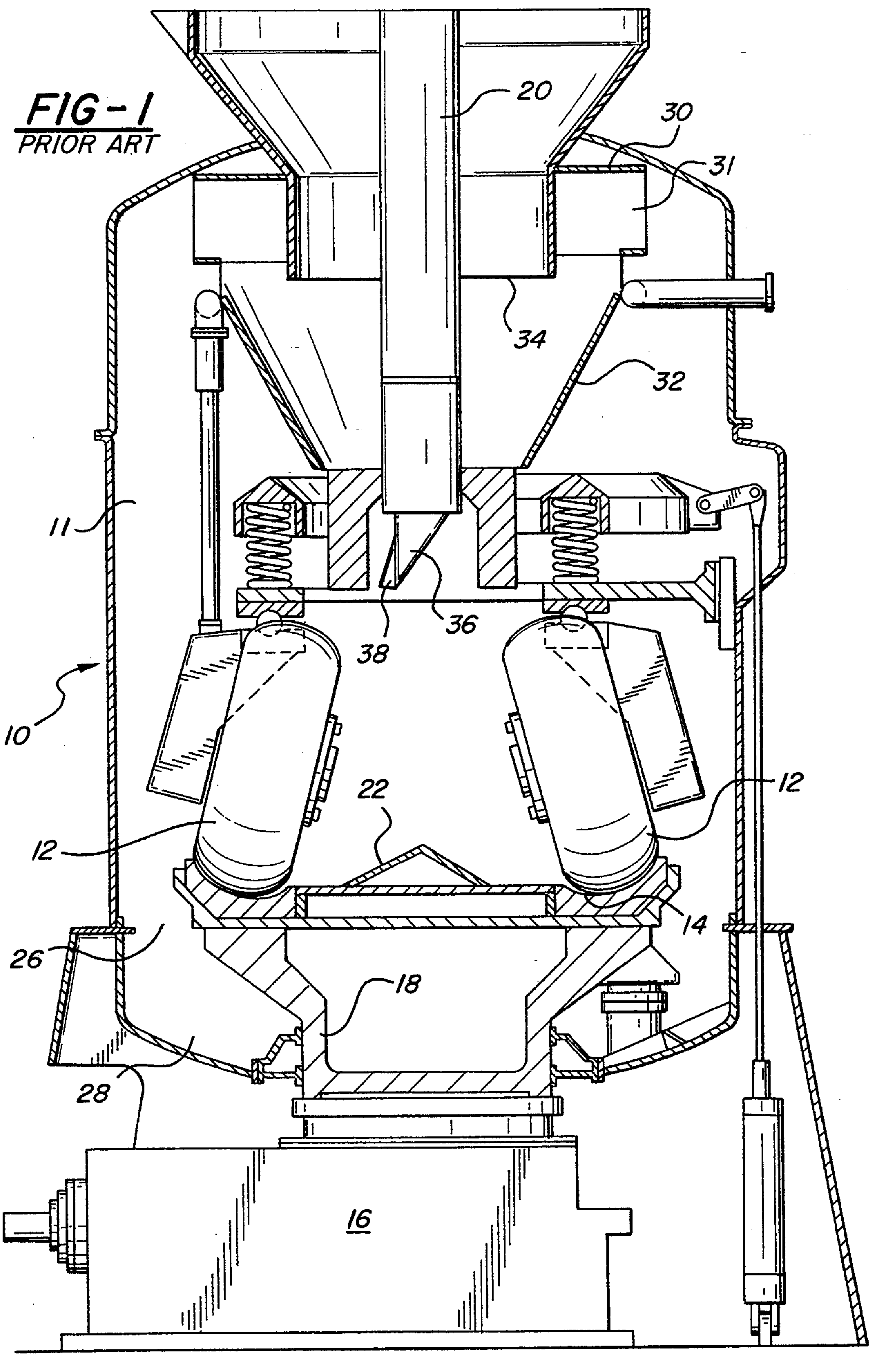
FIG-1 PRIOR ART
FIG. 1 is a side section view of a prior art classifier system in a bowl mill pulverizer.

Referring first to FIG. 1, a known bowl mill-type pulverizer 10 is shown in partial side section, comprising a pair of grinding rollers 12 mating with the grinding surfaces of the grinding ring 14. Grinding ring 14 is driven by a standard drive system shown schematically at 16 and a connecting yoke 18, rotating ring 14 relative to rollers 12. A feedpipe 20 extends from a suitable storage or sorting mechanism to deliver raw coal by gravity feed to the center of the bowl mill pulverizer 10. The incoming coal is diverted by a deflector 22 radially outward to the grinding rollers 12 and grinding ring 14, where it is crushed or ground into a relatively fine particulate form.

The base of pulverizer 10 includes a surrounding, ring-shaped pulverizer throat region 26 fed with air from an outside source via plenum 28 to deliver an annular flow of air up and around the periphery of pulverizer 10. Pulverizer throat region 26 may be provided with a throat (not shown) having a number of fixed or adjustable vanes or deflectors which determine the velocity of air flow. A particularly useful throat and vane/deflector structure disclosed, for example, in my U.S. Pat. No. 5,186,404.

The upward, annular air flow through pulverizer throat 26 lifts the ground coal particles from ring 14 up and around pulverizer 10 in region 11 to the top of the pulverizer. The velocity of air through throat 26 performs an initial classifying function by lifting and carrying only coal particles below a certain size.

The upper end of the pulverizer housing is provided with a further classifying system comprising a classifier ring 30 having a horizontal inlet 31 about its periphery, an inverted classifier cone 32, and a combustion delivery chute 34. Classifier ring 30, classifier cone 32 and combustion delivery chute 34 are mounted in concentric fashion about feedpipe 20. The upper end of classifier cone 32 surrounds the combustion delivery chute 34, with classifier ring 30 filling the gap therebetween. The annular lifting flow of air and coal fines from pulverizer throat 26 accordingly can only enter cone 32 and combustion delivery chute 34 through classifier ring 30.

Classifier ring 30 includes a number of fixed vanes (not shown) which impart a centrifugal component to the air and coal fine flow entering the cone from region 11 of the pulverizer. As the coal fines and air swirl around in the classifier cone, the heavier particles gravitate to the sides and settle out at the bottom of the cone, while the lighter, more finely ground fines are swirled up and into the combustion delivery chute to the combustion chamber.

As the heavier particles of coal drop to the bottom of the classifier cone, they are contained by a "flapper" or similar intermittent discharge assembly 36 at the bottom of the cone, which releases these collected fine rejects to the pulverizer for regrinding. FIG. 1 shows a common type of flapper assembly comprising a series of vertically hanging plates blocking the openings of one or more outlet chutes in the bottom of cone 32. The plates are hingedly mounted, and are relatively heavy, such that they are forced open only intermittently by the weight of the accumulated reject fines at the bottom of the classifier cone.

Other types of intermittent discharge structure are known in the art, but are not important to the present invention.

Still referring to FIG. 1, it can be seen that the height or drop-point of the outlets of the feedpipe 20 and classifier cone 32 are spaced well above the grinding apparatus 12, 14 of pulverizer 10. I have found through experience that this positioning subjects the raw coal flow from the feedpipe and the intermittent reject discharge from the classifier cone to the effects of the annular air flow from the pulverizer throat 26. Turbulence and deviation of the annular air flow around and above the pulverizer grinding structure 12, 14 is aggravated by the air flow disturbances created in the region of the feedpipe and classifier cone outlets as raw coal and reject fines are continuously or intermittently dumped onto grinding ring 14. Accordingly, not only does the position of the prior art feedpipe and classifier cone outlets inherently expose the downward coal flow to air flow disturbances, but it further compounds the magnitude and effect of those disturbances.

The result is oversized reject fines and small pieces of the raw feed coal being blown back up through or around the classifier cone, thereby thwarting its classifying function. These oversized particles can end up being delivered to the combustion chamber through the combustion delivery chute 34, reducing the effectiveness of the combustion process, wasting coal and contaminating the marketable ash byproduct with LOI lumps.

The flapper or other intermittent discharge structure 36 is also subject to mechanical jamming or malfunction. Moreover, the intermittent nature of the fine reject discharge further increases the disruptive effects of the fine rejects on the overall flow equilibrium of the pulverizer.

Figure 2:
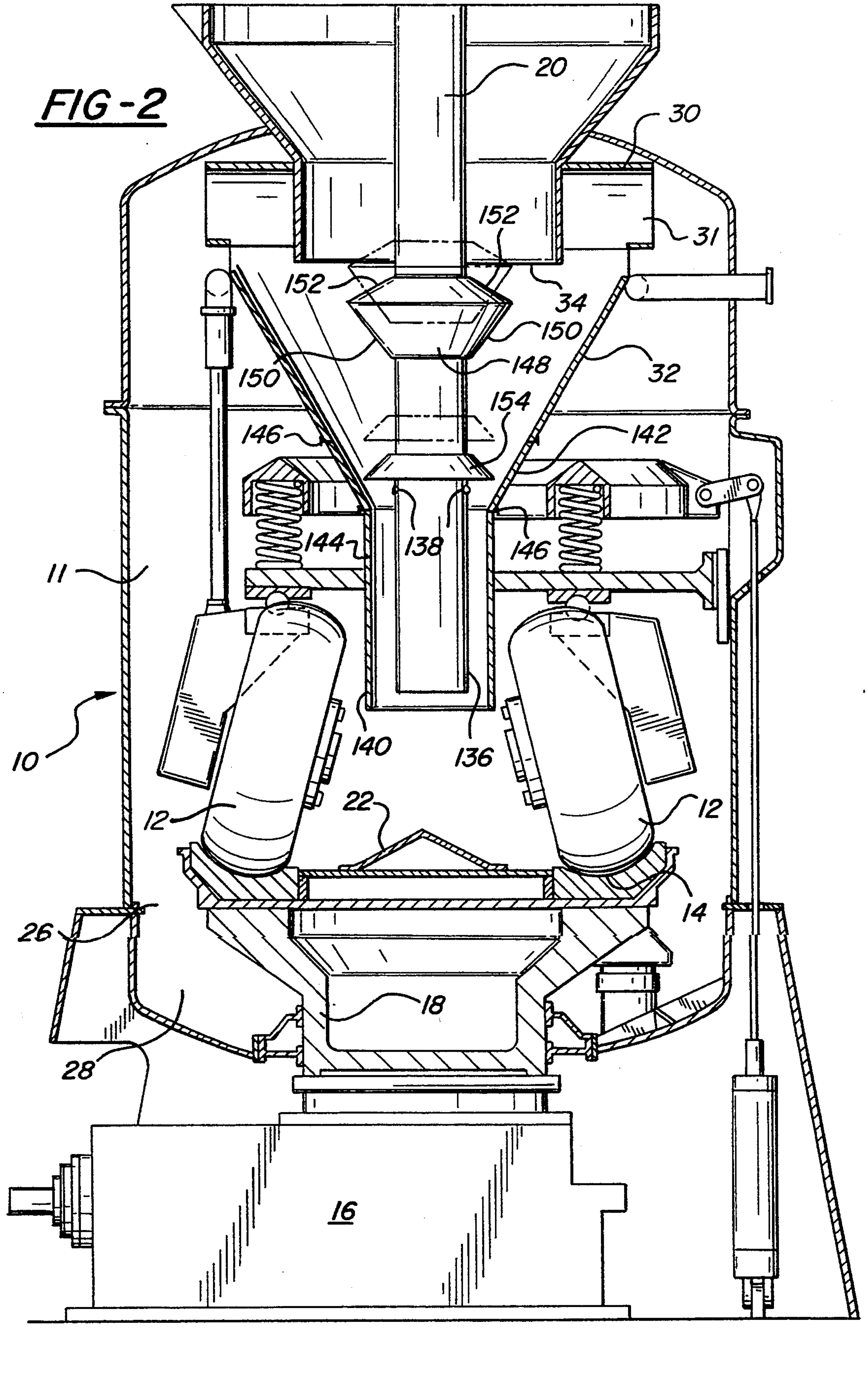
FIG. 2 is a side section view of a classifier system according to the present invention, also in a bowl mill pulverizer.

Referring now to FIG. 2, I have developed a number of inventive structural modifications to prior art pulverizer classifying systems of the type described above in reference to FIG. 1. In FIG. 2, the general pulverizer structure is the same as that shown in FIG. 1, and is referred to by the same reference numerals. However, flapper assembly structure 36, 38 has been replaced by a cylindrical feedpipe extension 136 and a sectional classifier cone extension 140. This modification of classifier cone 32 and feedpipe 20, and the corresponding elimination of the intermittent discharge flapper structure 36, 38 greatly improves the air and coal flow throughout the pulverizer and classifier system and the control over the fineness of coal ultimately delivered to the combustion chamber.

As shown in FIG. 2, feedpipe extension 136 is a cylindrical extension bolted or otherwise securely fastened to the end of feedpipe 20 at 138, for example by welding. Of course, other suitable ways of connecting the feedpipe extension to the feedpipe will be apparent to those skilled in the art. In the illustrated embodiment, the feedpipe extension extends approximately five to six feet below the original feedpipe outlet, to a point within grinding rollers 12 and no more than two to three feet above deflector 22 and grinding ring surfaces 14. The feedpipe extension 136 accordingly extends well below the original outlet or drop-point of feedpipe 20 and classifier cone 32 located above the pulverizer structure, to a point within the confines of the grinding structure and adjacent the grinding surface.

Sectional classifier cone extension 140 is similarly securely fastened to classifier cone 32 at 146, in the illustrated embodiment by suitable bolt structure. Cone extension 140 includes an upper cone-shaped portion 142 contiguous with classifier cone 32, and a cylindrical tailing portion 144 concentric with and parallel to feedpipe extension 136. The outlet of classifier cone extension 140 adjacent the grinding structure 12, 14 is located slightly below the outlet of feedpipe extension 136, creating a desirable pressure flow effect described in more detail below.

Although in the illustrated embodiment the feedpipe and classifier cone extensions 136,140 are shown as retrofit, bolt-on extensions of the original classifier structure, it will be apparent to those skilled in the art that the feedpipe 20 and/or classifier cone 32 could be originally manufactured with the extended portions 136, 140 to be located relative to the pulverizer structure as shown in FIG. 2. It is expected, however, that the primary market for the inventive extensions 136, 140 will be as retrofit devices to existing prior art structures.

The extension of the feedpipe and classifier cones in the manner described above produces a number desirable results with respect to the flow of coal and air throughout the pulverizer and classifier system. The feedpipe extension 136 eliminates the effects of raw coal flow at the narrow spout or outlet of classifier cone 32, and further creates a desirable pressure flow or "draw" toward the pulverizer grinding surfaces 22 14. The extension of the feedpipe outlet to a point within the confines of the pulverizer structure and adjacent the grinding surfaces also eliminates any turbulence or disruption to the annular fine-lifting airflow from pulverizer throat 26 in region 11 as the raw coal is dumped continuously or intermittently onto the pulverizer. The feedpipe extension outlet is effectively isolated from the upper regions of the pulverizer where the fine-lifting airflow from throat 26 is subject to deviation and turbulence on the way to classifier ring 30.

Classifier cone extension 140 similarly isolates the fine reject discharge from the annular airflow out of the pulverizer throat 26 in region 11, and simultaneously prevents the discharge from aggravating any disturbances in that annular airflow. The effective lengthening of the angled classifier cone 32 by sectional cone portion 142 allows more time for the coal fines to be swirled around and classified in cone 32, providing more control over the size of the fines ultimately fed to the combustion chamber via delivery chute 34. Additionally, the reject fines which require regrinding in the pulverizer spiral down around the feedpipe and are further drawn by the feedpipe flow onto the pulverizer in a manner which decreases the likelihood of reject fines being blown back up into or around the classifier cone. The location of the classifier cone extension outlet below the mouth of the feedpipe enhances this pressure flow or draw, created by the raw coal flowing downward in the regions between the parallel walls of feedpipe extension 136 and cone extension 140.

Of course, the elimination of the unreliable intermittent discharge structure 36,38 reduces the chance of clogging or jamming at the cone outlet. The continuous-flowing nature of the new feedpipe cone extension 140 further helps maintain a smooth flow equilibrium between the downwardly-flowing reject fines and the annular fine-lifting flow from throat 26; intermittent discharge structure tends to upset this equilibrium.

An additional feature of the present invention is an adjustable classifier venturi 148 mounted on the upper end of feedpipe 20 adjacent the inlet of combustion delivery chute 34. Classifier venturi 148 is vertically adjustable on feedpipe 20 toward-and away from the mouth of delivery chute 34 via any suitable mechanical or motorized control means (not shown).

Classifier venturi 148 defines two sets of venturi surfaces: lower venturi surfaces 150 and upper surfaces 152. By raising and lowering the classified venturi relative to combustion delivery chute 34, the velocity and angle of the coal fines exiting cone 32 can be adjusted with a great degree of control. When venturi 148 is raised, thereby reducing the size of the combustion chute inlet, the escape velocity of coal fines and air increases in accordance with well-known principles. At the same time, the opposingly angled upper and lower venturi surfaces 150, 152 adjust the exit angle of the air and coal fines, reducing the exit angle to a progressively more vertical direction parallel to delivery chute 34 at feedpipe 20.

Conversely, as classifier venturi 148 is lowered away from the inlet of delivery chute 34, the exit velocity is decreased and the exit angle correspondingly increases in somewhat arcuate fashion, becoming progressively more angled relative to the delivery chute 34 and feedpipe 20.

By way of further explanation, when classifier venturi 148 is in the lower position shown in solid lines in FIG. 2, the exit angle of the lighter fines swirling in the upper part of cone 32 is essentially parallel to upper venturi surfaces 152 and accordingly at a relatively sharp angle relative to chute 34 When classifier venturi 148 is in the raised position shown in dotted lines FIG. 2, with the upper leading edges of lower surfaces 150 essentially even with the plane of the inlet of delivery chute 34, the exit angle is essentially vertical and parallel to chute 34.

The lower venturi surfaces 150 of venturi 148 further act as angled deflectors, contacting the coal as it exits the cone near chute 34 and significantly slowing down larger particles of coal entrained in the exit flow. This reduces their velocity and causes them to drop back into the classifier cone for regrinding.

The dual-surfaced venturi 148 creates a complementary relationship between the exit angle and exit velocity of the coal flow leaving cone 32 via chute 34. As venturi 148 is raised to increase exit flow velocity, the simultaneous change in the exit angle toward the vertical results in a greater deflection of the centrifugally-swirling coal in the upper portion of cone 32 by surfaces 150. Accordingly, while undesirable larger coal particles may tend to be prematurely classified with the exit flow due to the higher escape velocity, they are also more likely to strike and be decelerated by lower surfaces 150 during the transition from radially swirling classification flow essentially perpendicular to delivery chute 34 to a nearly vertical exit flow.

The increase in exit flow velocity through delivery chute 34 is largely dictated by the flow rate needed by the combustion chamber.

An adjustable clearance cone 154 is also provided on the lower end of feedpipe 20 adjacent the throat of cone extension 140 at portion 142. Clearance cone 154 is also vertically adjustable on feedpipe 20.

the foregoing description is of an illustrative embodiment of the invention, and is not intended to limit the scope of the invention to those specific structures set forth for purposes of illustration. Various forms and modifications of the inventive structure will lie within the scope of the appended claims.

I claim:

1. In a coal pulverizer having classifier system, the system including a coal feedpipe to deliver raw coal to pulverizing structure from an outlet spaced above the pulverizing structure, a classifier cone positioned around the feedpipe to deliver oversize ground coal to the pulverizing structure via intermittent discharge structure from an outlet spaced above the pulverizing structure, and a combustion delivery chute positioned around the feedpipe above the classifier cone, the pulverizing structure delivering ground coal to an upper end of the classifier cone by an upwardly-directed stream of air traveling around and above the pulverizing structure, a method for improving the flow of coal throughout the classifier system, comprising the following steps:

extending the feedpipe into the pulverizing structure to a point where the coal exiting the feedpipe is isolated from the flow of air up and around the pulverizing structure;

replacing the intermittent discharge structure in the classifier cone with a classifier cone extension extending from the classifier cone outlet around the feedpipe extension into the pulverizing structure to a point where coal flow from the classifier cone extension is isolated from the flow of air up and around the pulverizing structure.

2. A method as defined in claim 1, further including the step of extending the classifier cone extension past the feedpipe extension.

3. A method as defined in claim 1, further including the step of providing an adjustable classifier venturi on the feedpipe in the classifier cone adjacent the coal delivery chute, and vertically adjusting the classifier venturi along the feedpipe to modify the exit velocity and exit angle of ground coal entering the combustion delivery chute from the classifier cone.

4. In a coal pulverizer having a classifier system, the system including a coal feedpipe to deliver raw coal to the pulverizing structure from an outlet spaced above the pulverizing structure, a classifier cone positioned around the feedpipe to deliver oversize coal to the pulverizing structure from a classifier cone outlet spaced above the pulverizing structure and the pulverizer delivering ground coal to an upper end of the classifier cone by an upwardly-directed flow of air traveling around and above the pulverizing structure, the improvement comprising:

feedpipe extension means extending from the feedpipe outlet into the pulverizing structure for isolating feedpipe coal flow from the air flow around and above the pulverizer.

5. A system as defined in claim 4, further including classifier cone extension means extending from the classifier cone outlet around the feedpipe extension means into the pulverizer.

6. A system as defined in claim 5, wherein the classifier cone extension means include a cone-shaped portion contiguous with the classifier cone and terminating above the feedpipe outlet, and a cylindrical tailing section parallel with the feedpipe extension means.

7. A system as defined in claim 6, wherein the classifier cone extension is longer than the feedpipe extension.

8. A system as defined in claim 7, wherein the feedpipe extension terminates within the cylindrical tailing section of the classifier cone extension.

9. In a cola pulverizer having a classifier system, the system including a coal feedpipe to deliver raw coal to pulverizing structure from an outlet spaced above the pulverizing structure, a classifier cone positioned around the feedpipe to deliver oversize coal to the pulverizing structure from a classifier cone outlet spaced above the pulverizing structure and a coal delivery chute positioned around the feedpipe above the classifier cone, the pulverizer delivering ground coal to an upper end of the classifier cone by an upwardly-directed stream of air traveling around and above the pulverizing structure, the improvement comprising:

feedpipe extension means extending from the feedpipe outlet into the pulverizing structure; and an adjustable classifier venturi mounted on the feedpipe in the classifier cone adjacent the combustion delivery chute, the classifier venturi vertically adjustable along the feedpipe to adjust the exit velocity and exit angle of ground coal entering the combustion delivery chute.

10. A system as defined in claim 9, wherein the classifier venturi defines upper and lower venturi surfaces.

11. A system as defined in claim 10, wherein the classifier venturi adjusts the exit angle of coal fines through the combustion delivery chute in arcuate fashion as it is vertically raised.

* * * * *

UNITED STATES PATENT AND TRADEMARK OFFICE

CERTIFICATE OF CORRECTION

PATENT NO. : 5,386,619

DATED : February 7, 1995

INVENTOR(S) : Wark

It is certified that error appears in the above-indentified patent and that said Letters Patent is hereby corrected as shown below:

Column 1, line 26, delete "several feet adore" and insert --several feet above--;

Column 1, line 46, delete "centrifugal" and insert --centrifugal flow.--;

Column 1, line 64, delete "feedpipe ant" and insert --feedpipe and--;

Column 2, line 2, delete "the pulverizer" and insert --the pulverizer throat.--;

Column 2, line 16, delete "paths throughout one" and insert --paths throughout the--;

Column 2, line 31, delete "or the pulverizer" and insert --of the pulverizer--;

Column 2, line 41, delete "removed from-the" and insert --removed from the--;

Column 2, line 49, before "extend" and insert --extension--;

Column 2, line 55, delete "feedpipe and classified" and insert --feedpipe and classifier --.

Column 5, line 35, delete "surfaces 22 14 and insert --22,24--;

UNITED STATES PATENT AND TRADEMARK OFFICE

CERTIFICATE OF CORRECTION

PATENT NO. : 5,386,619

DATED : February 7, 1995

INVENTOR(S) : Wark

It is certified that error appears in the above-indentified patent and that said Letters Patent is hereby corrected as shown below:

Column 6, line 10, delete "toward-and" and insert --toward and--;

Column 6, line 38, delete "chule 34 When" and insert --chute 34. When--;

Column 6, line 39, delete "dotted lines Fig. 2" and insert --dotted lines in Fig. 2--.

Signed and Sealed this

Twenty-fifth Day of April, 1995

Attest:

BRUCE LEHMAN

*Attesting Officer*

*Commissioner of Patents and Trademarks*